(12) United States Patent
Calm

(10) Patent No.: US 10,606,086 B2
(45) Date of Patent: *Mar. 31, 2020

(54) NEAR-EYE-DISPLAY (NED) THAT EMPLOYS RAPID SPHERICAL IMAGE SCANNING

(71) Applicant: George Mataban Calm, Milpitas, CA (US)

(72) Inventor: George Mataban Calm, Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/356,758

(22) Filed: Mar. 18, 2019

(65) Prior Publication Data
US 2019/0219829 A1    Jul. 18, 2019

Related U.S. Application Data

(63) Continuation of application No. 15/708,135, filed on Sep. 19, 2017, now Pat. No. 10,310,273.

(60) Provisional application No. 62/396,778, filed on Sep. 19, 2016.

(51) Int. Cl.
| | |
|---|---|
| *G02B 27/01* | (2006.01) |
| *G02B 5/30* | (2006.01) |
| *G02B 27/00* | (2006.01) |
| *G02B 27/28* | (2006.01) |

(52) U.S. Cl.
CPC ......... *G02B 27/0189* (2013.01); *G02B 5/30* (2013.01); *G02B 27/0081* (2013.01); *G02B 27/0172* (2013.01); *G02B 27/283* (2013.01); *G02B 2027/013* (2013.01); *G02B 2027/0123* (2013.01)

(58) Field of Classification Search
CPC ...... G02B 5/30; G02B 5/3033; G02B 5/3025; G02B 27/26; G02B 27/017; G02B 27/0172; G02B 27/01; G02B 27/0189; G02B 2027/0123; G02B 2027/013; Y10T 428/1041; G02F 1/133528; G02F 1/13362; G02F 1/1393; G09G 3/003
See application file for complete search history.

(56) References Cited

U.S. PATENT DOCUMENTS

| | | | |
|---|---|---|---|
| 2015/0370074 A1* | 12/2015 | McDowall | G02B 27/0172 349/11 |
| 2015/0378074 A1* | 12/2015 | Kollin | G02B 5/3016 349/185 |

* cited by examiner

*Primary Examiner* — Jia X Pan
(74) *Attorney, Agent, or Firm* — Antero, Tormey & Petrin; Pete Tormey

(57) ABSTRACT

A NED-RapSIS with concentric imaging and optical elements comprising a display with spherically curved concave image surface topped with polarizer; a spherically curved concave composite reflector having polar arrayed alternating mirror-quarterwavelength retarder strips, and clear optical slits; a spherically curved transparent counter-balance; a motor-driven driving crank near the edges that drives the reflector and counter-balance to circular-spherical movement; a slave crank near the opposite edge of composite reflector with its shaft and crank arms aligned to the concentric center another slave crank near the opposite edge of the counter-balance with its shaft and crank arms aligned with the shaft and crank arms respectively of the latter crank and aligned with the concentric center; a see-thru spherically curved mirror-polarizer composite with mirror at the convex side and polarizer at the concave side, and a support frame.

8 Claims, 16 Drawing Sheets

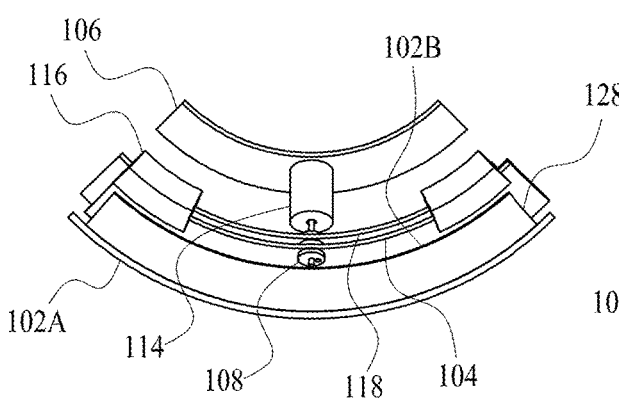
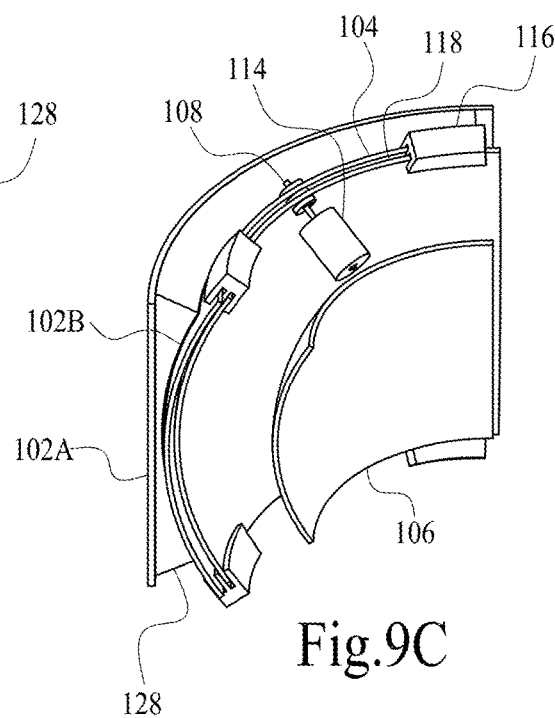
Fig.9A
Fig.9C
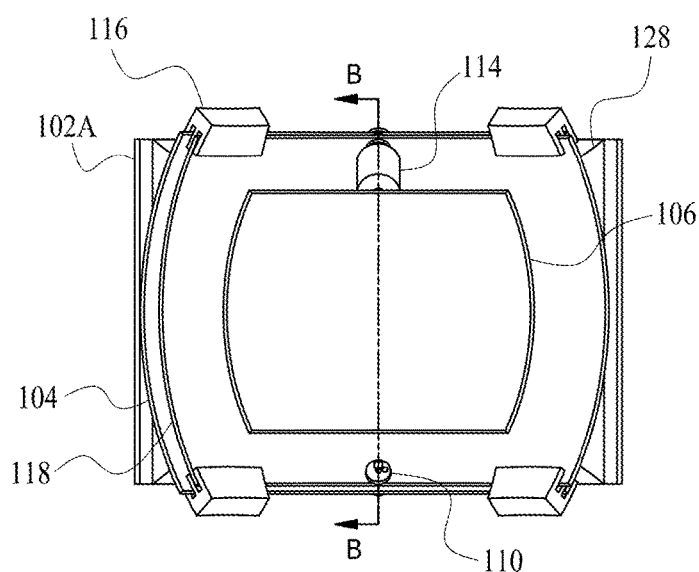
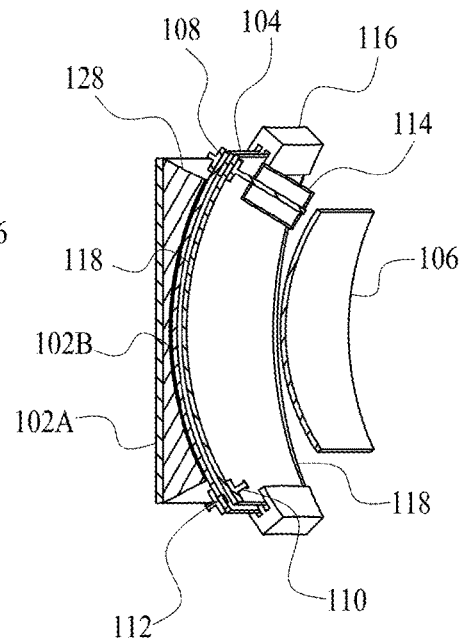
Fig.9B
Fig.9D

PRIOR ART

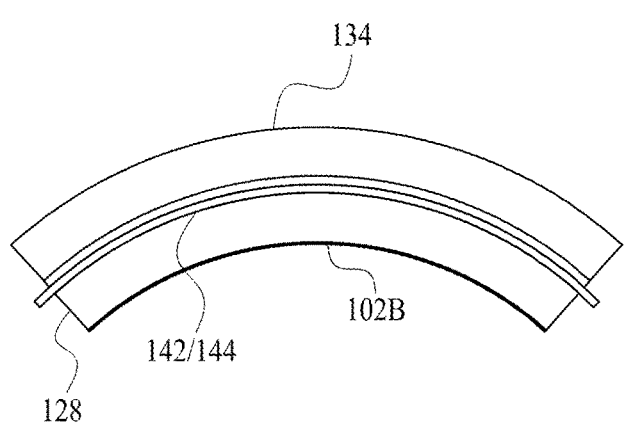
Fig.16A
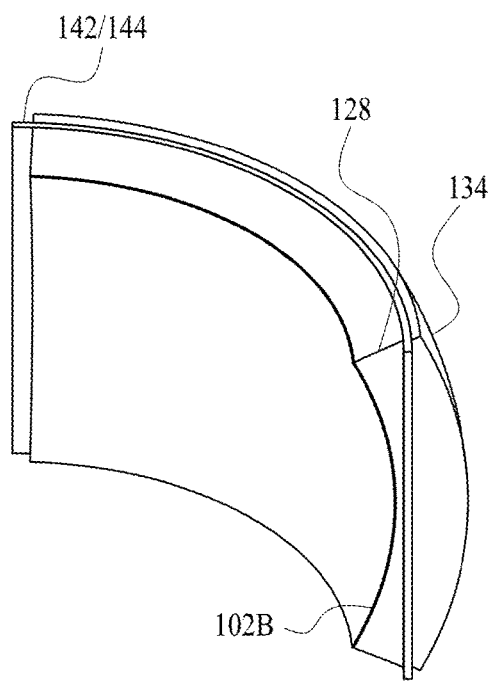
Fig.16C
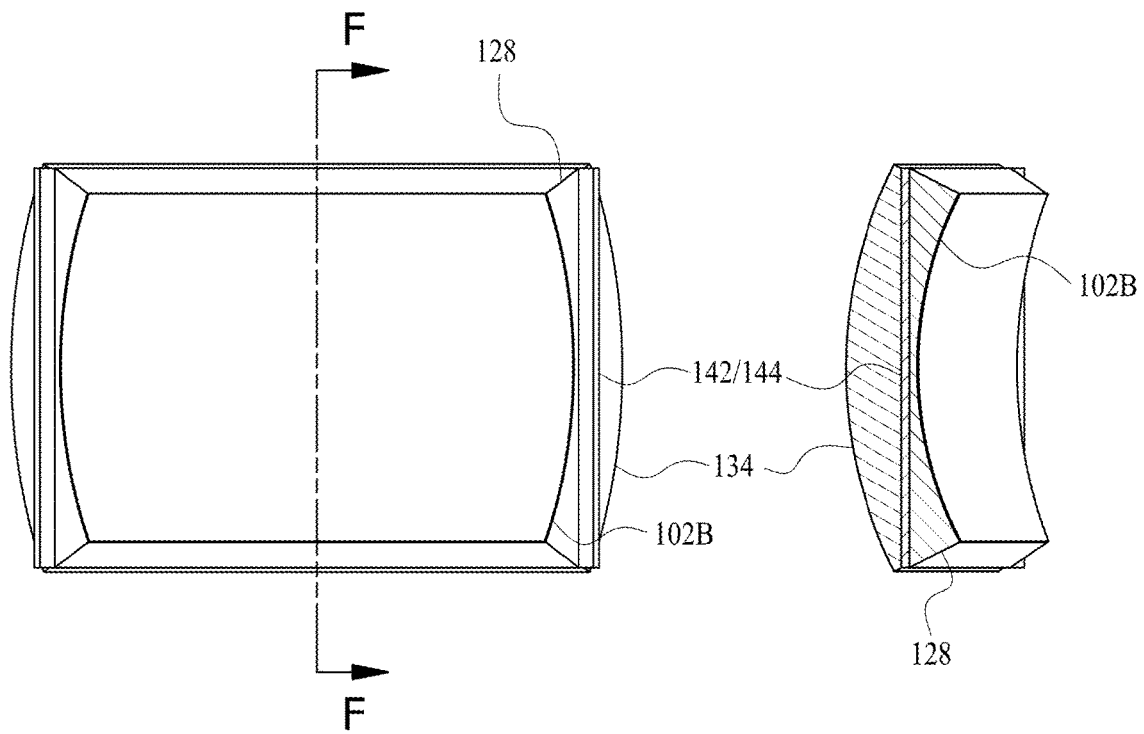
Fig.16B
Fig.16D

NEAR-EYE-DISPLAY (NED) THAT EMPLOYS RAPID SPHERICAL IMAGE SCANNING

PRIORITY

This application is a continuation of co-pending application Ser. No. 15/08,135, filed Sep. 19, 2017 by the same inventor, which in turn claims the benefit of provisional application Ser. No. 62/396,778, both of which are included by reference as if fully set forth herein.

BACKGROUND

To make descriptions simple, descriptions of NED for one eye is used unless specified for pair of eyes.

Some NEDs are used in virtual reality (VR) devices. NEDs of VR devices have eyes enclosed from external view to effect immersive display. VR devices requires NEDs with a minimum of 80 degrees field-of-view (FOV) so that the viewer does not seem to be looking out from the window with the edges of the view showing. NEDs in VR devices use combination of lenses to focus on small display or image source. The problem is that this train of lenses are uncomfortably long, complex and bulky to achieve the minimum FOV and large eye box. An eye has a FOV of around 200 degrees horizontal and around 135 degrees vertical with eye rotation included (no head movement relative to NED). The pupil of the eye can be in locations covering around ¾ of an inch cube eye box with eye rotation and being slightly far or near the NED. NEDs having wide FOV and large eye box approaching these extents are ideal. Unfortunately, even the largest lens in NEDs that can be used in VR devices prohibits the NED from achieving a very wide FOV. Optical problems arise when the eye starts to rotate from the optical axis or move away from the focal plane. Attempts to solve these problems using concentric optical system did not produce satisfactory FOV or image quality. Prior concentric optical system for NEDs use combination of see-thru mirrors, polarizers, quarterwave retarders, and lens system to cut and fold the optical path. Unfortunately, light from the image source passes through and reflected from these elements so many times that the image quality becomes degraded so much.

There are NEDs used for see-thru or augmented reality (AR) devices. AR NEDs are similar to VR NEDs except AR NEDs can overlay the image to the external view. NEDs in AR devices have displays or image sources placed away from line of sight and use angled see-thru mirror or beam splitter to see the local display overlaid to the external view. These AR NEDs have unsatisfactory FOV. The angled see-thru mirror prohibits the NED from having wide FOV. Prior concentric optical system for NEDs of AR devices have failed to produce wide FOV with good image quality.

NEDs in AR devices have image from local display overlaid against the external view. Dark parts of the image unfortunately turn light when set against bright external view. The image could be very hard to see against brightly colored external view. Masking or occluding systems to cover parts or the whole image of the local display from external view to control the opacity against the external view have been tried. Unfortunately, these attempts have failed.

U.S. Pat. Nos. 5,517,366 and 5,659,430 both to Togino describes the advantages of using lenses in concentric optical system for NEDs to provide wide FOV and large eye box. Togino's embodiment uses beam-splitting mirrors, polarizers, and quarterwave retarders described in U.S. Pat. No. Re. 27356 to La Russa to fold and cut optical paths. La Russa's embodiment, however, greatly reduces the light finally reaching the viewer's eye thereby degrading the image so much.

U.S. Pat. No. 4,859,031 to Berman et al offered a solution to the beam-splitting mirror, polarizer, and quarterwave retarders combination problem of Togino's and La Russa's embodiment. By employing cholesteric liquid crystal element to the optical combinations, Berman was able to improve the image reaching the viewer's eye. With Berman's embodiment, however, the color of which the cholesteric liquid crystal is tuned is reduced by about 50% thereby degrading the transmitted image to the observer. The other 50% of the color is reflected back to the concave mirror then reflected back towards the cholesteric liquid crystal and then transmitted towards the observer. The transmitted color, however, is unfocused thereby degrading the image further. Another disadvantage is that the generated image which is overlaid to external view can only be in one color of which the cholesteric liquid crystal is tuned. Other colors from the image source which are not tuned will be transmitted by the cholesteric liquid crystal to the observer unfocused. Another disadvantage is that it has small FOV.

U.S. Pat. No. 7,639,208 to Ha et al. describes a compact see-through HMD with occlusion support. Ha's embodiment is a NED that is intended to be used for augmented reality applications. Ha's embodiment, however, has small FOV. The train of optical elements is very long. The external image reaching the eye is flipped right to left.

A NED for AR device using concentric optical system has been described by Rolf R. Hainich in his paper "Freeform Mirrors and Displays for AR" in sub-title "Approaches to Ideal Freeform Mirror and Display Shapes for Augmented Reality". He describes a NED using spherical display in combination with concentric optical system. His description is that the display should be emitting outward away from the eye or on the convex side of the display so that the image is reflected back by the concentric concave spherical mirror. Part of the reflected image then passes through the spaces between the pixels then towards the eye which is behind the display. The spaces, however, removes the pixels from the display to allow the image to pass through thereby reducing the display resolution. The pixels at the display also blocks part of the reflected image thereby reducing the image further. Hainich's description of the NED does not describe an occluding system.

SUMMARY

In accordance with one embodiment, a NED that employs Rapid Spherical Image Scan (NED-RapSIS) comprises a display with spherically curved concave image surface topped with polarizer; a spherically curved concave composite reflector having polar arrayed alternating mirror-quarterwavelength retarder strips, and clear optical slits; a spherically curved transparent counter-balance; a driving crank near the edges that drives both the composite mirror and the counter-balance to circular-spherical movement with its shaft aligned to the concentric center; a motor that drives the driving crank; a slave crank near the opposite edge of composite mirror with its shaft aligned to the concentric center; another slave crank near the opposite edge of the counter-balance with its shaft aligned with the shaft of the latter crank and aligned with the concentric center; spherical guide or guides to constrain both the composite mirror and the counter-balance to spherical movements; a see-thru spherically curved mirror-polarizer composite with mirror at the convex side and polarizer at the concave side; a frame to support, protect the device and mount the device to the head.

Accordingly, several advantages of one or more aspects are as follows: to provide a NED that employs rapid spherical image scan that produces "persistence of vision" to realize wider FOV and larger eye box, that have folded optical path that makes the NED compact and have satisfactory clearer view of the display, that can provide bigger space between the eye and the NED, that is capable of integrating an occluding system with high resolution and wide FOV. Other advantages of one or more aspects will be apparent from consideration of the drawings and ensuing description.

BRIEF DESCRIPTION OF THE DRAWINGS

FIG. 9A shows top view of the NED with cylindrically curved display according to third embodiment.

FIG. 9B shows a rear view of the NED with cylindrically curved display according to third embodiment.

FIG. 9C shows a rear view isometric of the NED with cylindrically curved display according to third embodiment.

FIG. 9D shows a section B-B of the NED with cylindrically curved display according to third embodiment.

FIG. 16A shows a top view of the cylindrically curved display/LCD occluder with convex and concave fiber-optic faceplates.

FIG. 16B shows a rear view of the cylindrically curved display/LCD occluder with convex and concave fiber-optic faceplates.

FIG. 16C shows a rear isometric view of the cylindrically curved display/LCD occluder with convex and concave fiber-optic faceplates.

FIG. 16D shows a section F-F of the cylindrically curved display/LCD occluder with convex and concave fiber-optic faceplates.

DETAILED DESCRIPTION

FIGS. 1 to 6

Figure 1:
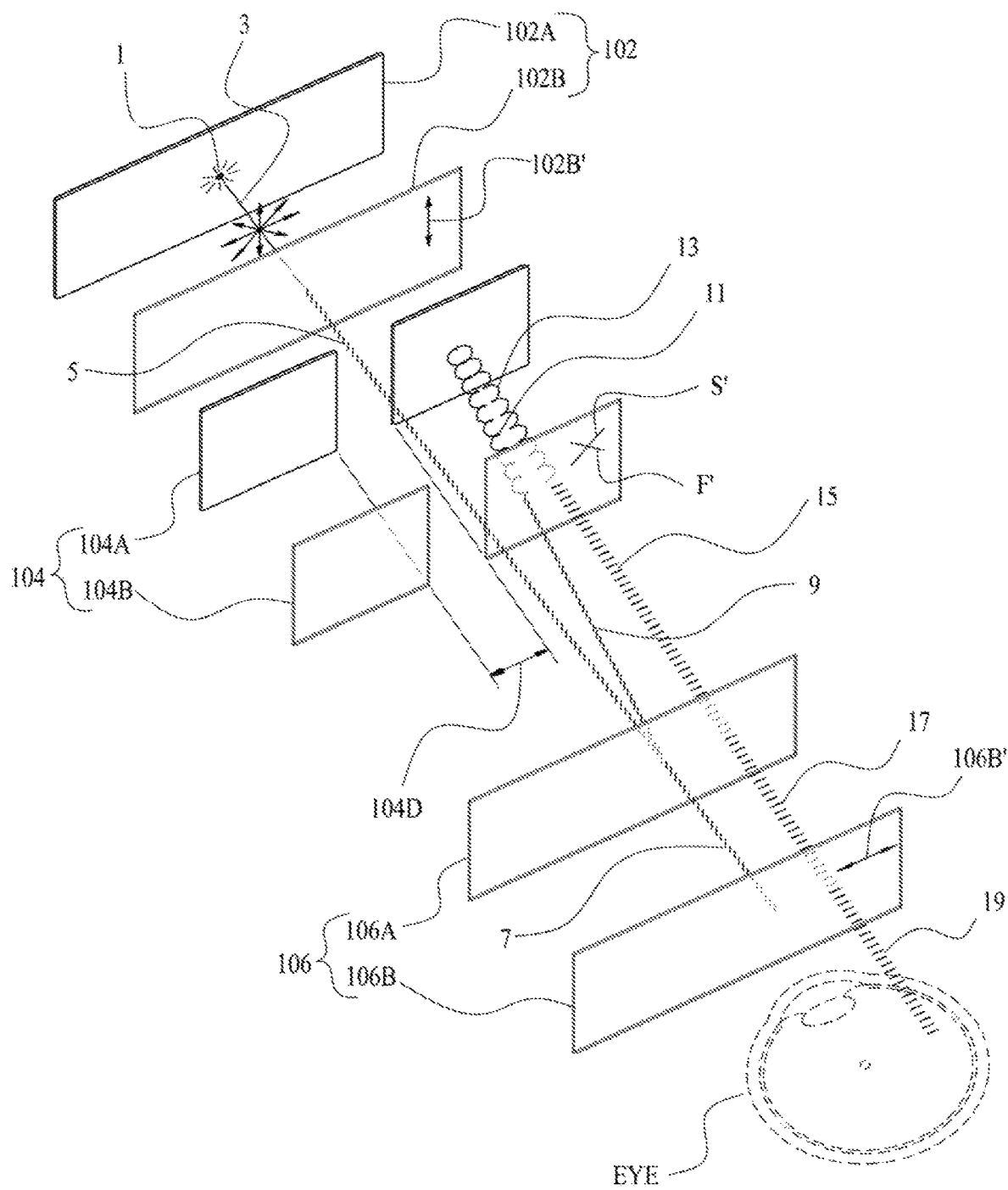
FIG. 1 is a diagrammatic isometric illustration useful in explaining the paths of light from display point source to finally reaching the eye according to first, second, third, fourth, and fifth embodiment.

The NED that employs rapid spherical image scan (NED-RapSIS) has a spherically curved polarized concave display (102) like spherically curved LCD displays. Alternatively, the display can be composed of spherically curved non-polarized concave display (102A) like spherically curved OLED displays with the image showing at the concave side and topped by display polarizer (102B). Typical setup of the display is that it (102) is controlled by the display controller circuit board (124) and computer. The display polarizer (102B) is assumed to have longitudinal polarizing orientation (102B' and 23) although other orientation will suffice. Near but not touching and concentrically at the concave side of the display polarizer (102B) is the spherically curved composite reflector (104). The composite reflector (104) is composed of concave transparent base (104C) topped with concave mirror longitudinal strips (104A) at the convex side and topped at the concave side by quarterwave retarder longitudinal strips (104B) with the slow axis (S') oriented at around 45 degrees from polarizing orientation (102B' and 23) of display polarizer (102B) and fast axis (F') oriented at 90 degrees from the slow axis (S'). The concave mirror strips (104A) are preferably coated with light absorbing material. The composite reflector (104) have transparent optical slits (104D) in alternating arrangement with the mirror/retarder (104A/104B). Concentrically at the concave side of spherically curved composite reflector (104) is the transparent concave counterbalance (118). The spherically curved composite reflector (104) and transparent concave counterbalance (118) is both mounted to the drive crank (108) at crank arms (108B, 108C) near the edges. At the opposite edges, the composite reflector (104) is mounted to the composite reflector slave crank (112) at the crank arm (112B) while the transparent counterbalance (118) is mounted to the counterbalance slave crank (110) at crank arm (110B). There may be a need to mount the composite reflector (104) and the transparent counterbalance (118) on separate cranks (110 and 112) so as to compensate for the slight rotation difference while completing a cycle. After each cycle, both the spherically curved composite reflector (104) and the transparent counterbalance (118) are at the same phase.

The crankshaft (108A) of the drive crank is radially aligned to the concentric center (21). The crankshaft of both composite reflector slave crank (112) and counterbalance slave crank (110) are aligned to each other and are both radially aligned to the concentric center (21). All the crank arms (108B, 112B, 110B)) are also aligned to the concentric center (21) and are of equal angle (37) from their respective crankshafts. The drive crank (108) is mounted to the motor (114) at the crankshaft (108A). Concentrically at the concave side of the counterbalance is the see-thru convex mirror/polarizer (106). It is composed of concave transparent base, topped with see-thru convex mirror at the convex side and topped at the concave side by exit polarizer (106B). The exit polarizer has rotated longitudinal polarizing orientation (106B') or oriented at around 90 degrees from display polarizing orientation (102B'). The NED-RapSIS is supported and mounted to the head by the frame (120). The NED-RapSIS employs enclosing means for the eye and the display (102) to block external view to effect immersive display for VR applications.

Operation

The spherically curved concave display (102) is the image source of the NED-RapSIS. Light from the display is polarized by the display polarizer (102B). Let us assume that the display polarizer is set to have a longitudinal polarizing orientation (102B'). When non-polarized light (3) from the light source (1) is transmitted by the polarizer (102B), light becomes polarized to latitudinal orientation (5). The polarized light (5) from the display (102) is blocked by the concave mirror strips (104A) but allowed to pass at transparent optical slits (104D). The polarized light (5) then encounters the see-thru convex mirror/polarizer (106). About half of polarized light passes thru (7) and the rest is reflected (9) by the see-thru convex mirror (106A). The polarized light (7) that passes thru encounter the exit polarizer (106B). The exit polarizer (106B) is set to rotated latitudinal polarizing orientation (106B') which is 90 degrees from longitudinal polarizing orientation (102B'). The polarized light (7) is blocked by the exit polarizer (106B). The reflected polarized light (9) which is still longitudinally polarized (102B' and 23) goes back to the spherically curved composite reflector (104). The polarized light (9) encounters the quarterwave retarder strips (104B) with its slow axis (S') or fast axis at 45 degrees from longitudinal orientation (102B' and 23). The polarized light becomes circularly left or right polarized (11) after passing through the quarterwave retarder strips (104B). The circularly polarized light (11) encounters the concave mirror (104A) and reflected with circularly reversed polarized light (13). The circularly reversed polarized light (13) encounters the quarterwave retarder (104B) again and then converted to linearly polarized light (15) with polarization rotated at longitudinal orientation (106B'). The linearly polarized light (15) encounters the see-thru convex mirror (106A) again. About half are reflected back at reversed propagation (15, 13, 11, 9, 7, and 5) of which some are blocked by the exit polarizer (106B) and some dissipates at (5) direction. The other half of transmitted polarized light (17) that passes the see-thru convex mirror (106A) encounters the exit polarizer (106B). This time, the linearly polarized light (19) pass thru the exit polarizer (106B) and reaches the eye.

The light that reaches the eye are satisfactorily clear and bright. Partial image reaches the eye coming from optical slits (104D) which are initially set at "A" parts of the display or image source (102) shown in FIG. 2A. The motor is powered on and it rotates the drive crank (108). The drive crank (108) and the composite reflector slave crank (112) sets the spherically curved composite reflector (104) in spherical and circular motion from the crank arms (108B and 112B). The drive crank (108) and the counterbalance slave crank (110) sets the transparent concave counter balance (118) also in spherical and circular motion at the opposite crank arms (108C and 110B). During the spherical and circular motion of the elements, the longitudinal line (77) which is at midpoint between two crank arms maintains intersection of the sphere's vertical axis (75). The sphere's horizontal axis (35) maintains rotation at the horizontal plane. The slits move to "B" parts of the display (102) shown in FIG. 2B. The composite reflector (104) and the counter balance (118) rotates more and sets the slits to "C" parts of the display (102). The composite reflector (104) and the counter balance (118) rotates back around to the initial position (FIG. 2B then FIG. 2A) completing one spherical image scan cycle. All parts rotate rapidly in balance so that vibration is reduced to negligible. The spherical image scan cycle is set at speed that makes the partial images reaching the eye as full clear images.

Alternative Embodiments

Another embodiment is the same as the first embodiment with a difference is that an enclosing means to prevent external view is not used. Another difference is that the second embodiment have transparent spherically curved polarized concave display (102) like transparent OLED or see-thru LCD display. Another difference is that it has an LCD occluder (122) at the convex side of the display (102) that covers (79) parts or all of the image (39) from external view (33). Each pixel in the LCD occluder (122) controls the amount of light transmitted to the transparent display (102). The LCD occluder (122) is controlled by LCD occluder controller circuit (126) and computer.

The path and polarization of light from display up to reaching the eye is the same as the first embodiment. The second embodiment allows light from external view (33) to come in. The light from external view is controlled by the LCD occluder (122). The light can be blocked (79) resulting in opaque image (41). The opaque image (41) can be seen even with light background from the external view (33). Parts of the image not covered will result in the image transparently viewed with the external view (43). Each covering unit in the LCD occluder (122) covering each pixel of the display (102) are controlled so that the amount of light allowed to pass through is programmatically managed.

The third embodiment is the same as the first embodiment with the difference is that the display or image source (102A) is replaced by cylindrically curved or flexible display (like OLED or LCD display) with fiber-optic faceplate (128). The fiber-optic faceplate (128) is topped at the cylindrically curved side by the display (102A) and topped at spherically curved concave side by the display polarizer (102B).

Figure 2A:
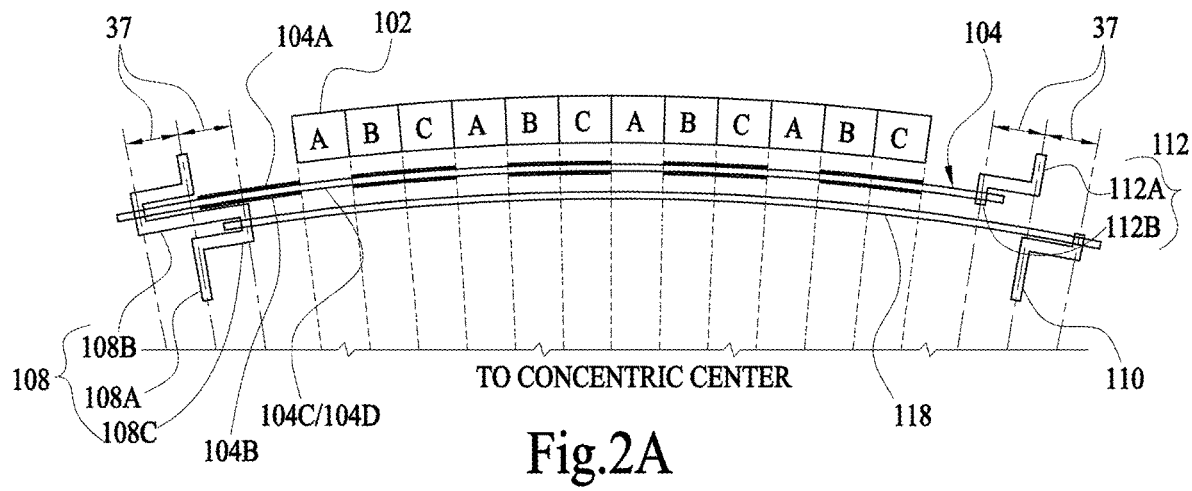
FIG. 2A is a graphic illustration useful in explaining spherical image scan.
Figure 2B:
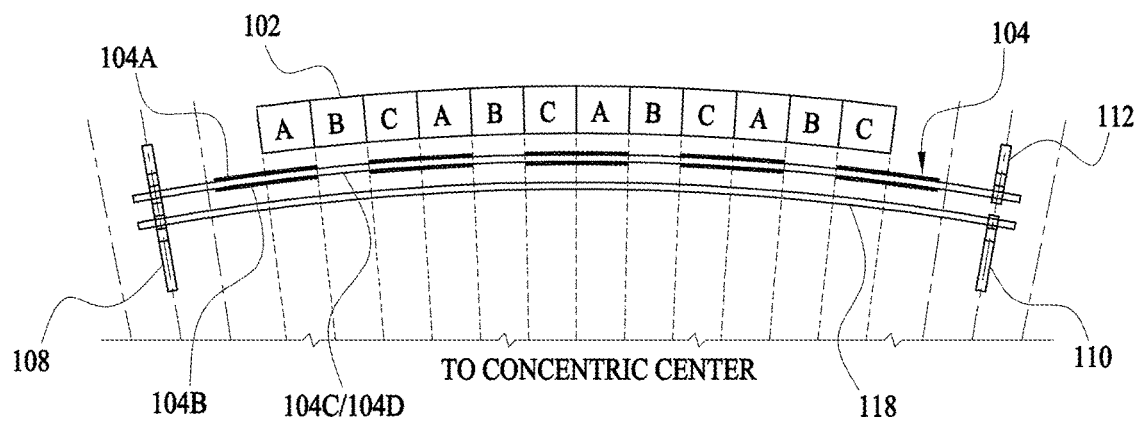
FIG. 2B is a graphic illustration useful in explaining spherical image scan.
Figure 2C:
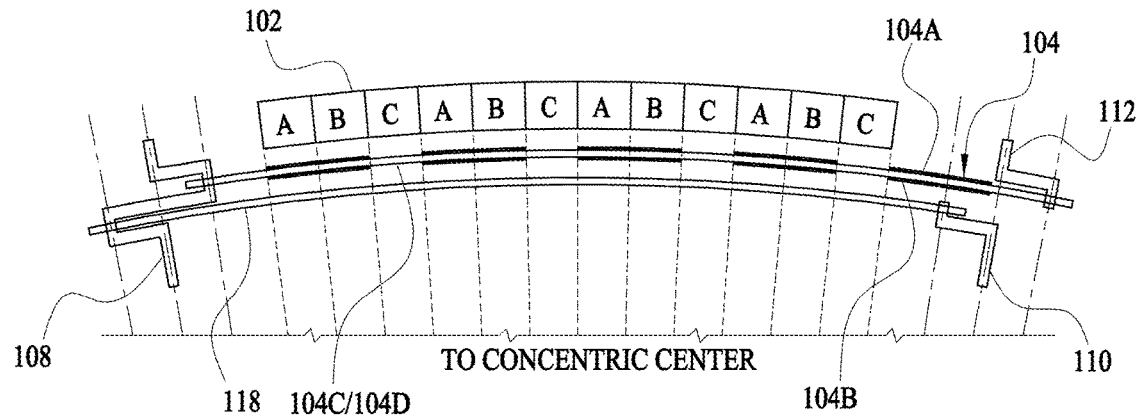
FIG. 2C is a graphic illustration useful in explaining spherical image scan.
Figure 3A:
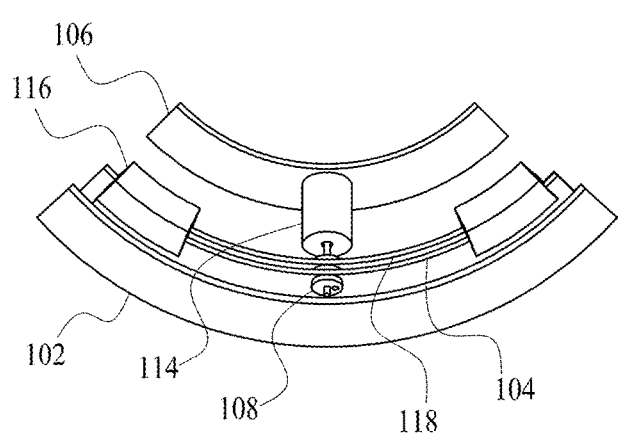
FIG. 3A shows top view of the NED with spherically curved display according to first embodiment.
Figure 3C:
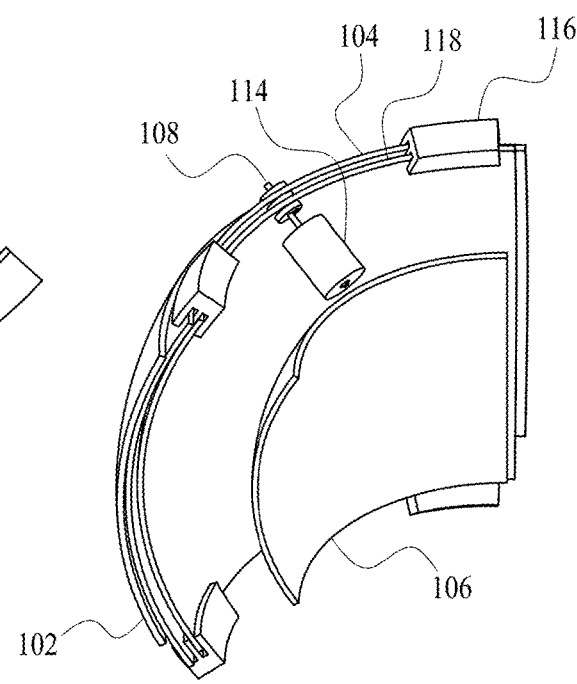
FIG. 3C shows a rear isometric view of the NED with spherically curved display according to first embodiment.
Figure 3B:
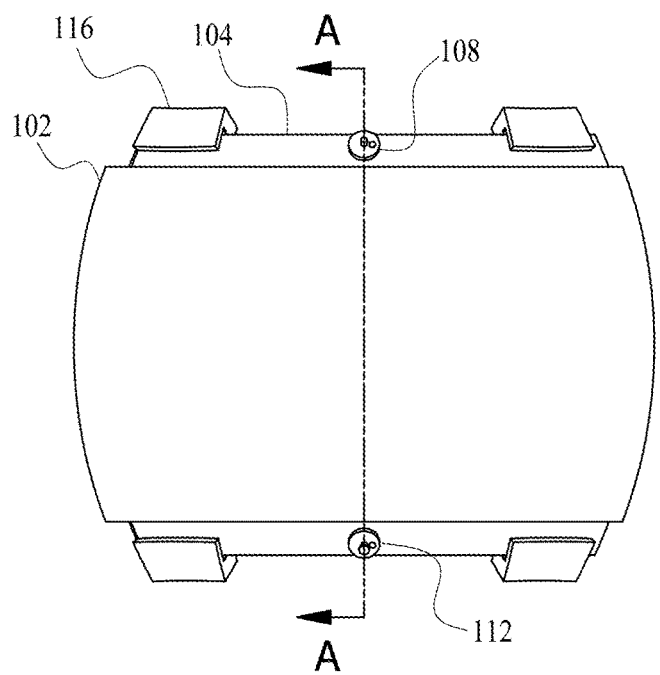
FIG. 3B shows a front view of the NED with spherically curved display according to first embodiment.
Figure 3D:
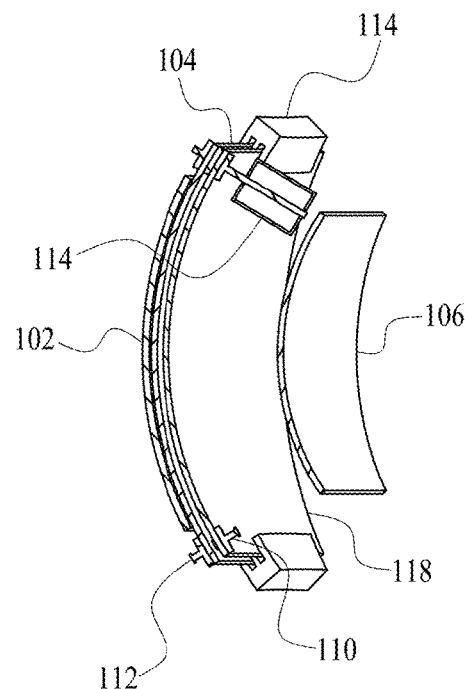
FIG. 3D shows section A-A respectively of the NED with spherically curved display according to first embodiment.
Figure 4:
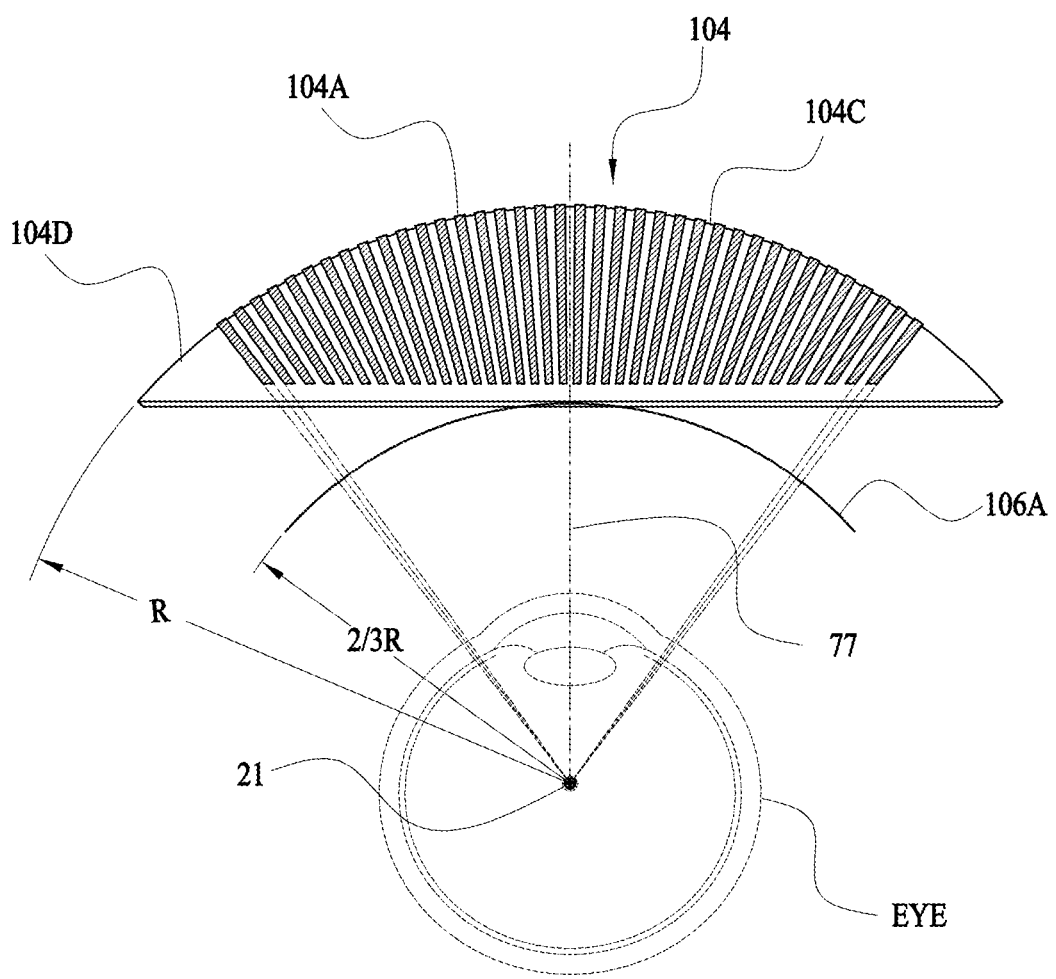
FIG. 4 shows top view of the spherically curved concave mirror—quarterwavelength retarder composite with approximate ratio of its radius relative to see-thru convex mirror radius.
Figure 5:
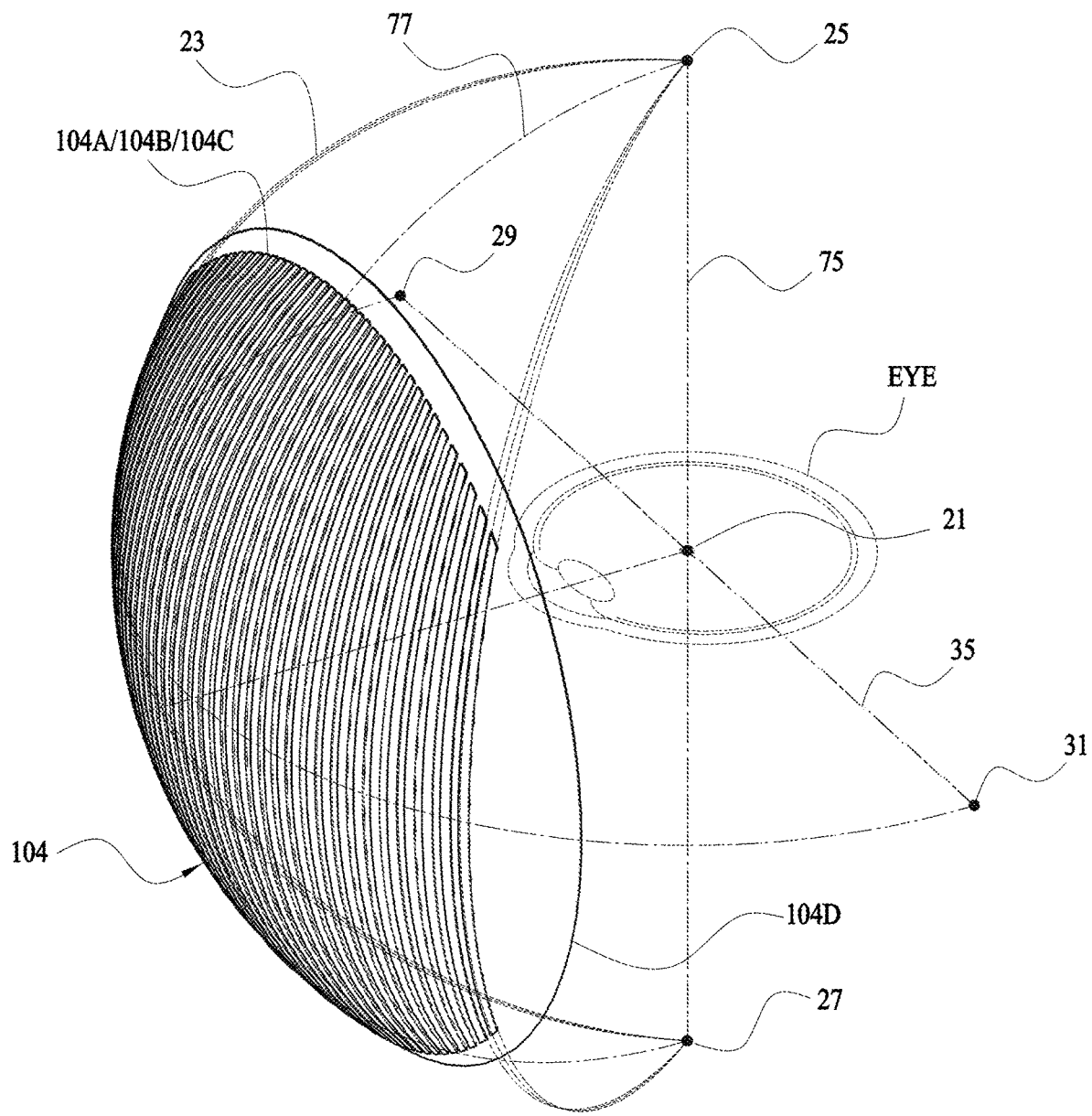
FIG. 5 shows isometric view of spherically curved concave mirror—quarterwavelength retarder composite with relative geometrical alignments.
Figure 6:
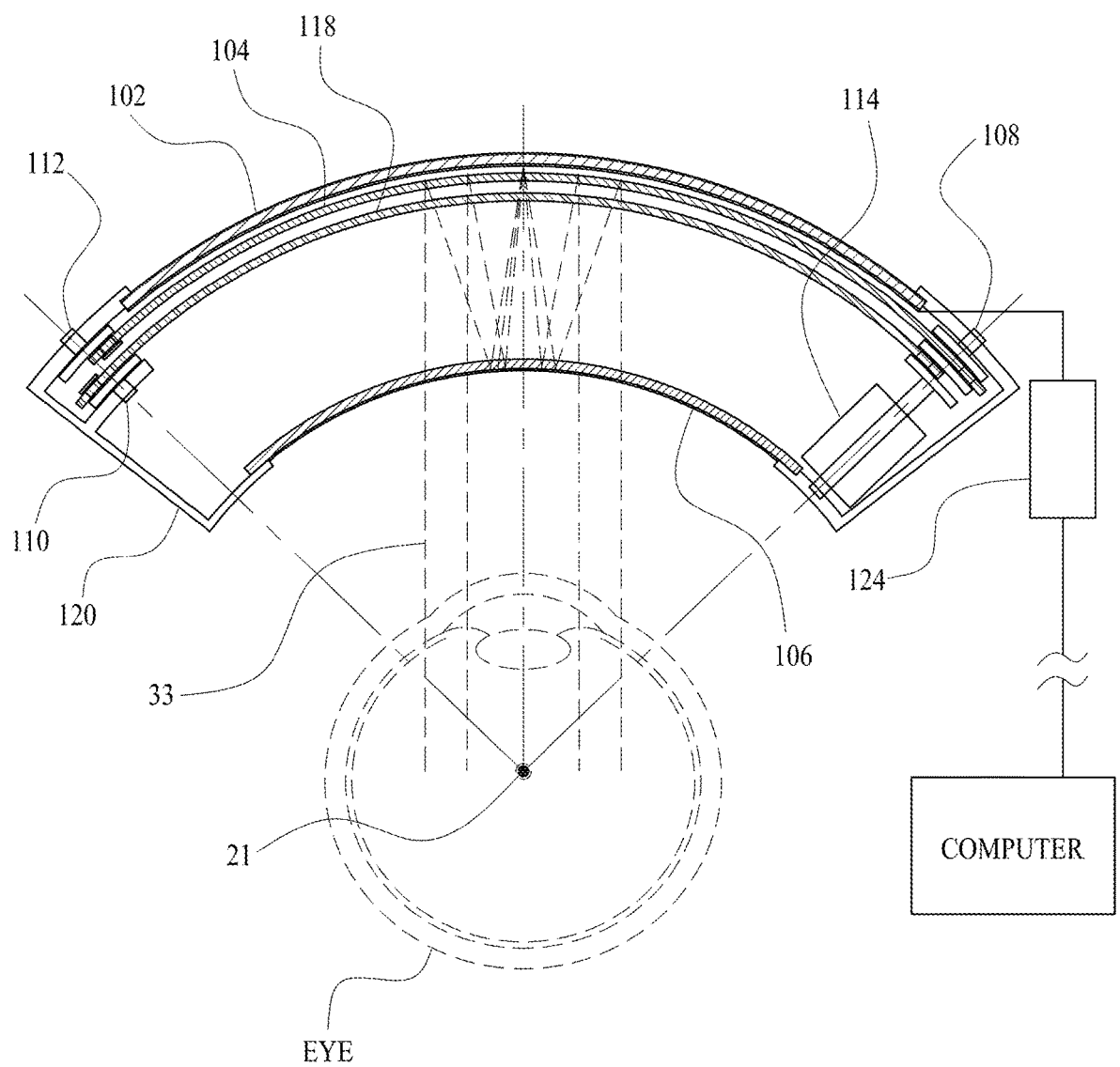
FIG. 6 shows plan view of the first embodiment.
Figure 7:
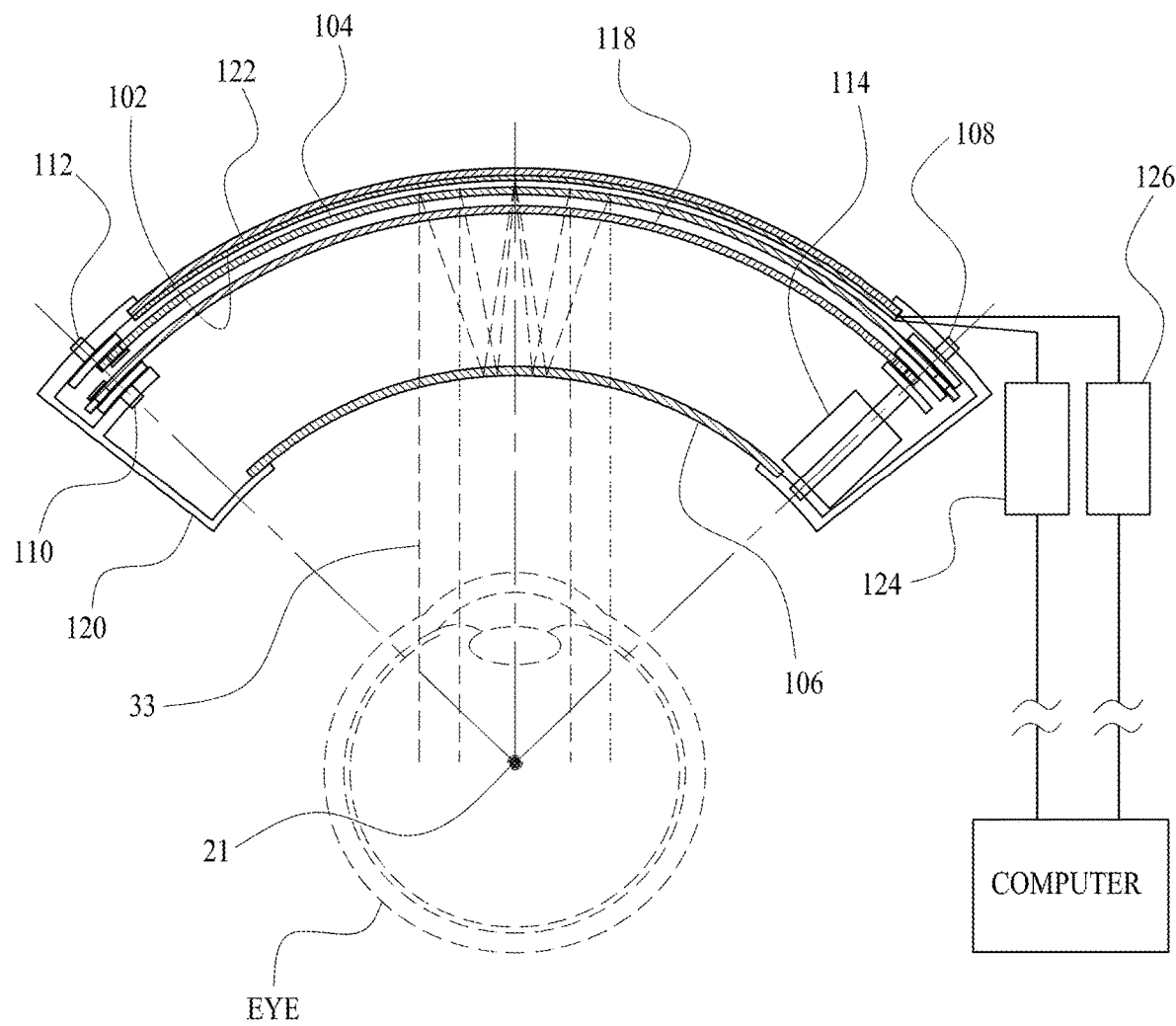
FIG. 7 shows plan view of the second embodiment with LCD light blocking system.
Figure 8:
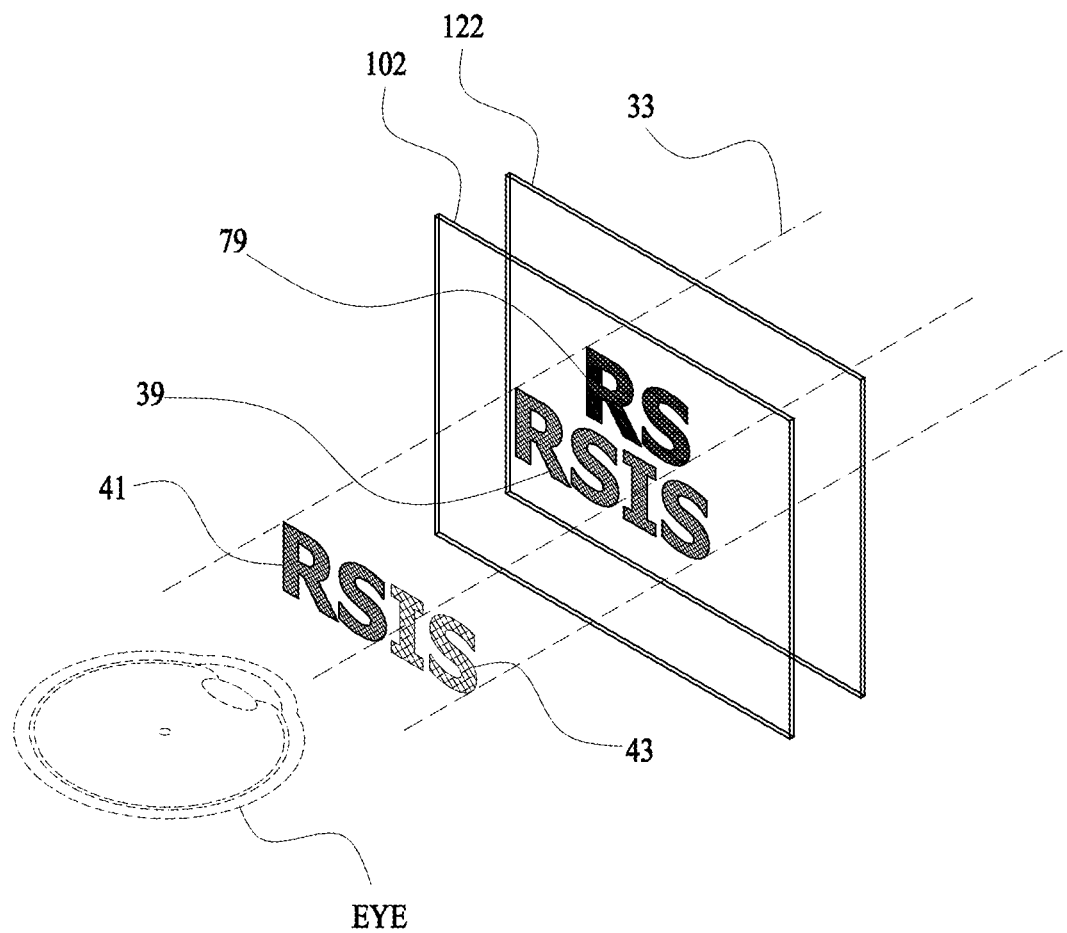
FIG. 8 shows diagrammatic isometric useful in explaining the LCD light blocking system.
Figure 10A:
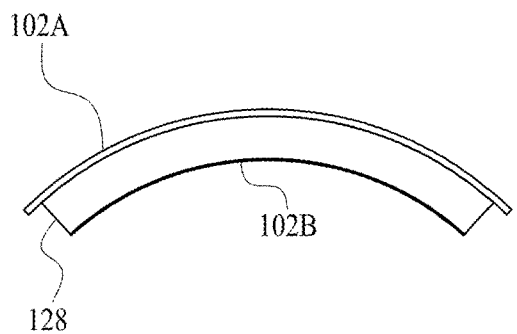
FIG. 10A shows a top view (with comparison to prior art).
Figure 10C:
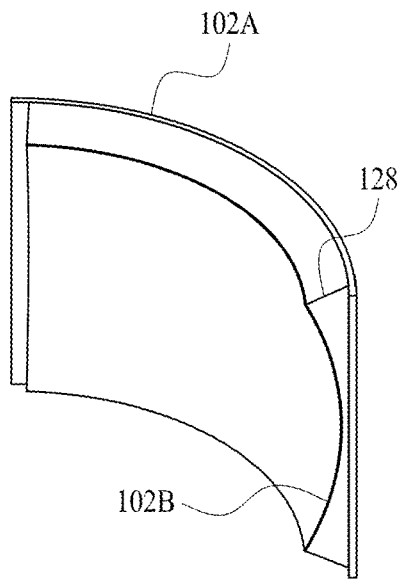
FIG. 10C shows a rear isometric view.
Figure 10B:
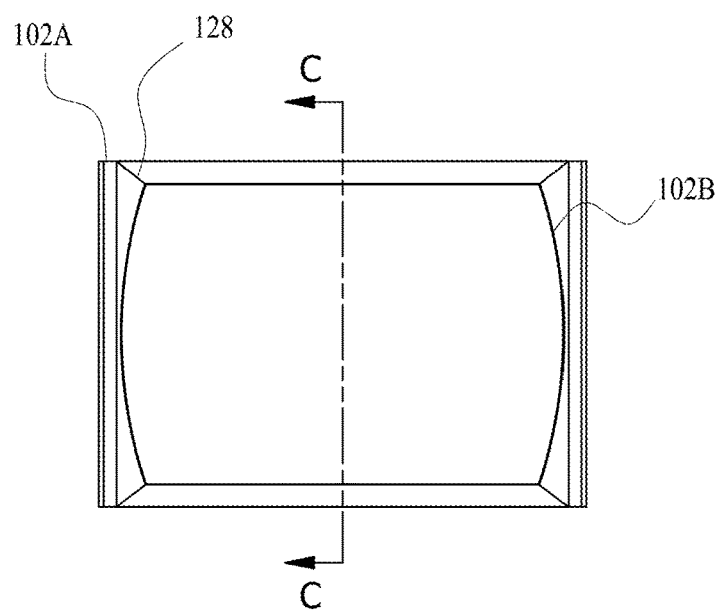
FIG. 10B shows a rear view, rear isometric view.
Figure 10D:
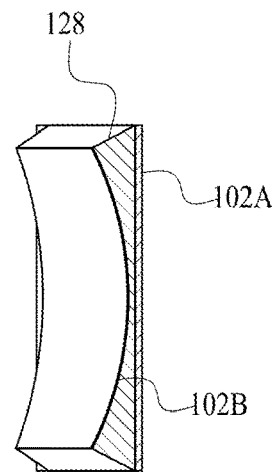
FIG. 10D shows a section C-C respectively.
Figure 11:
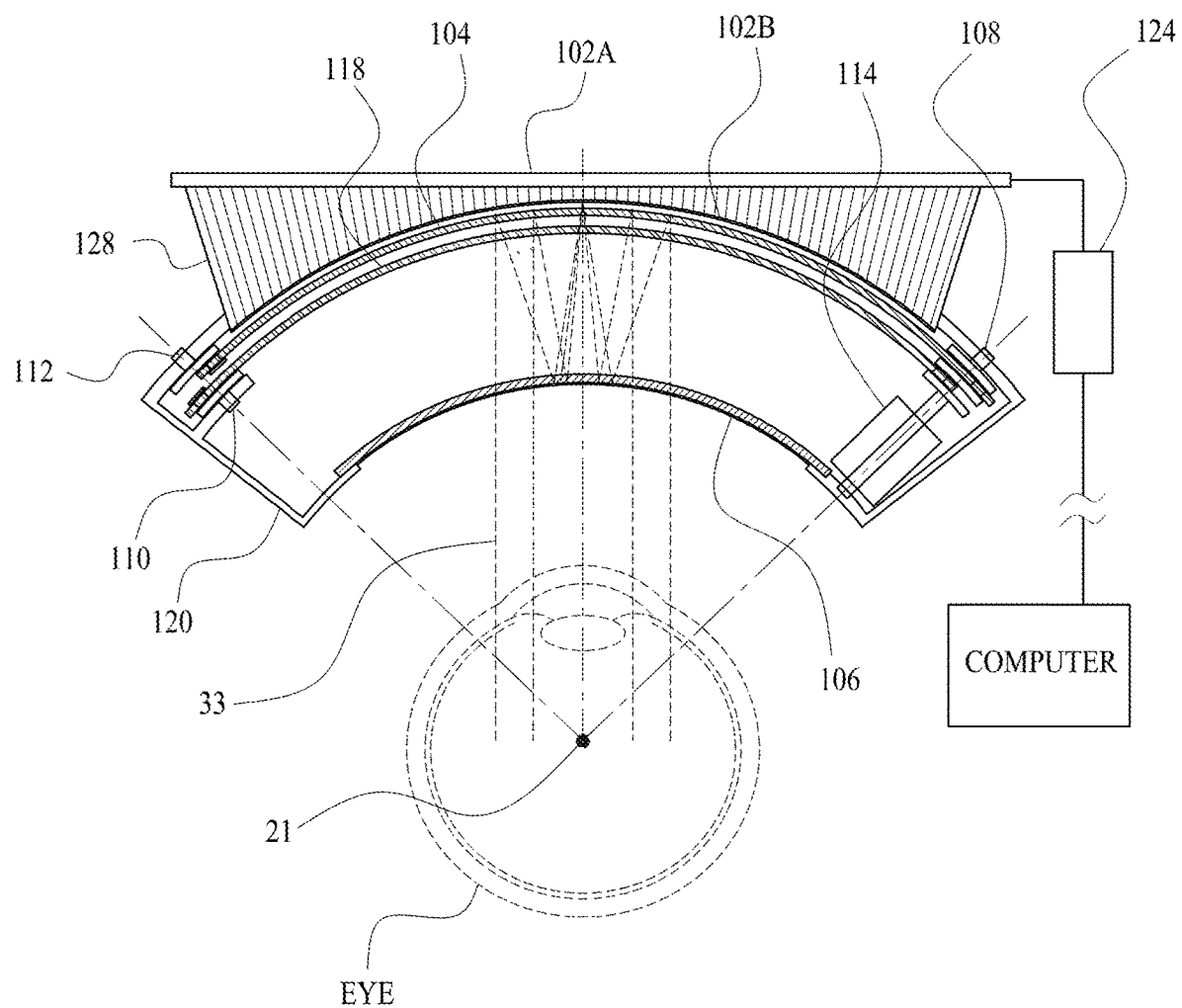
FIG. 11 shows plan view of third embodiment.
Figure 12:
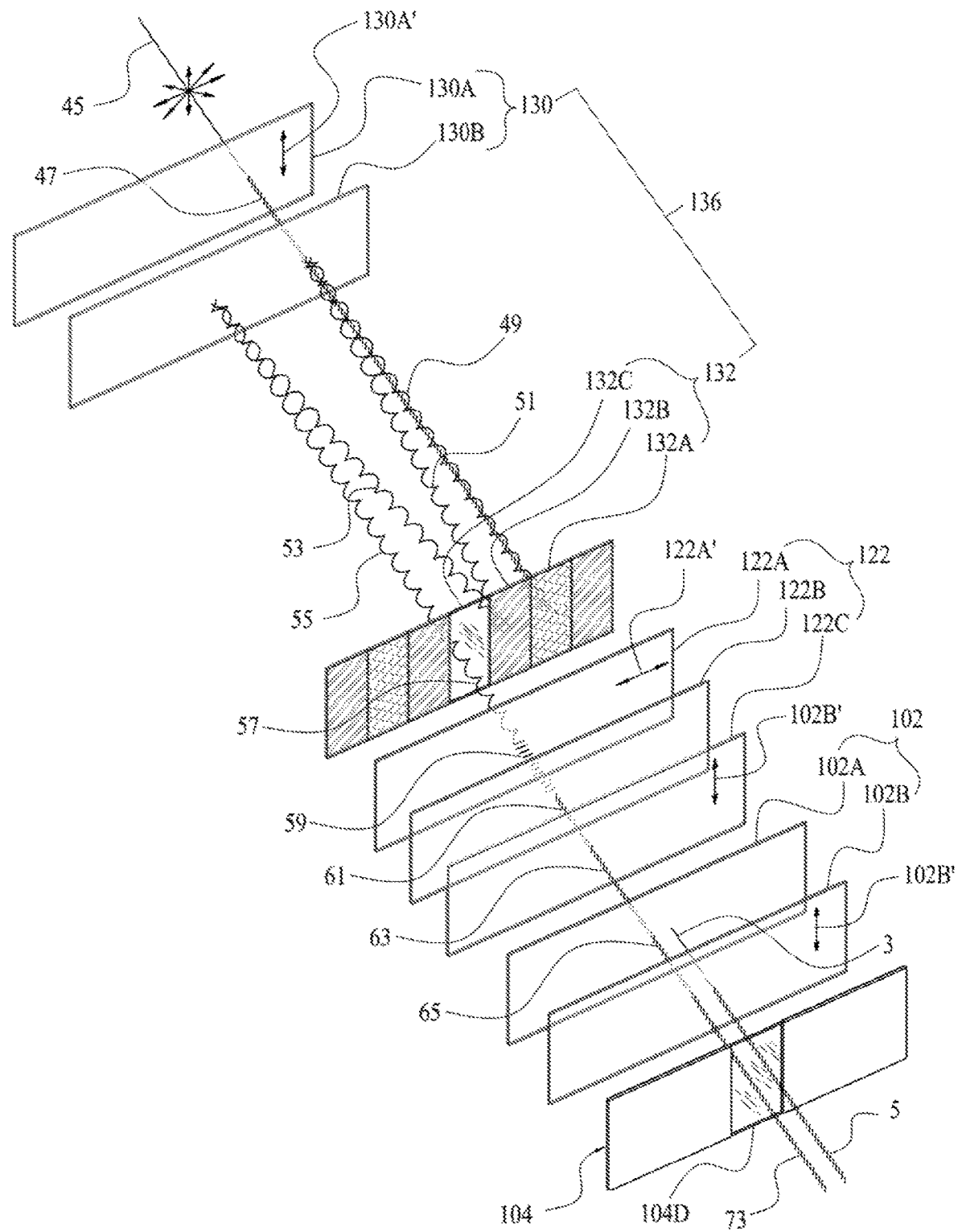
FIG. 12 is a diagrammatic isometric illustration useful in explaining the paths of light from external view point source to finally reaching the eye according to fourth, and fifth embodiment.

FIGS. 1, 2A/B/C, 3A/B/C/D, 9A/B/C/D, 10A/B/C/D, and 11

The operation is the same as the first embodiment. The difference is that the image from the cylindrically curved or flexible display (102A) is relayed to the concave side of the fiber-optic faceplate (128).

FIGS. 1, 2, 5, 12, 13A/B, and 14A/B/C/D

The fourth embodiment is the same as the second embodiment where the difference is the addition of the occluding optical system (136). The occluding optical system is composed of polarizer/see-thru concave mirror plate (130) and occluding composite reflector plate (132). The occluding composite reflector plate radius is approximately ¾ the radius of the polarizer/se-thru concave mirror plate. Minor adjustments on radii are done so that the retro-reflected light

(49) is reflected (51) from concave mirror (130B) to geometrically hit the convex mirror strips (132B), to be reflected again (53) and reflected back (55) to occluding composite reflector (132) and hit the transparent optical slits (132C). The polarizer/see-thru concave mirror plate (130) has spherically curved transparent base plate topped by occluding polarizer (130A) on the convex side and topped at the concave side by see-thru concave mirror (130B). The occluding polarizer (130A) has longitudinal polarizing orientation (130A') which is the same with display polarizer orientation (102a). The polarizer/see-thru concave mirror plate (130) is concentric with spherically curved concave display (102).

Figure 13B:
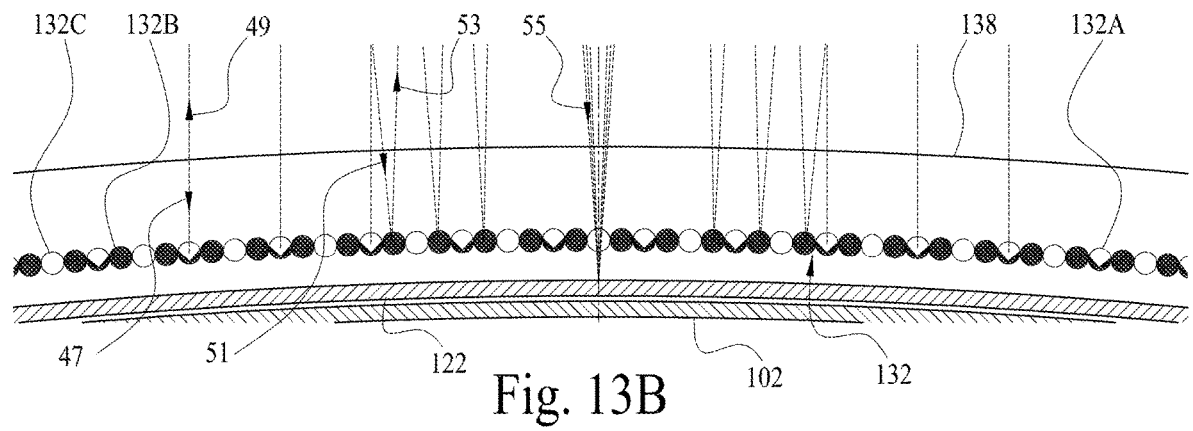
FIG. 13B shows an enlarged detail of the composite reflector of the occluding system.
Figure 13A:
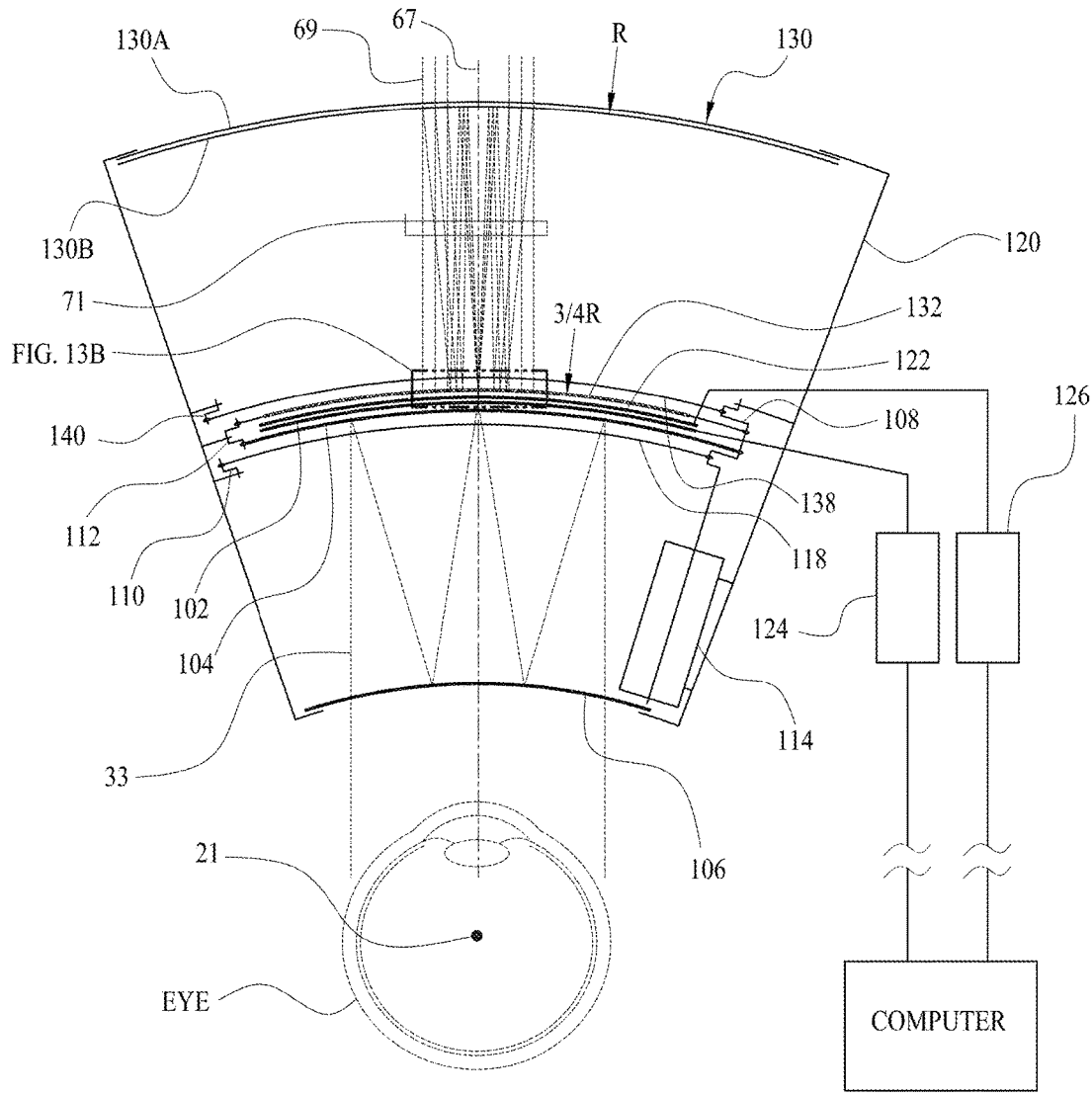
FIG. 13A shows a plan view of the composite reflector of the occluding system.
Figure 14A:
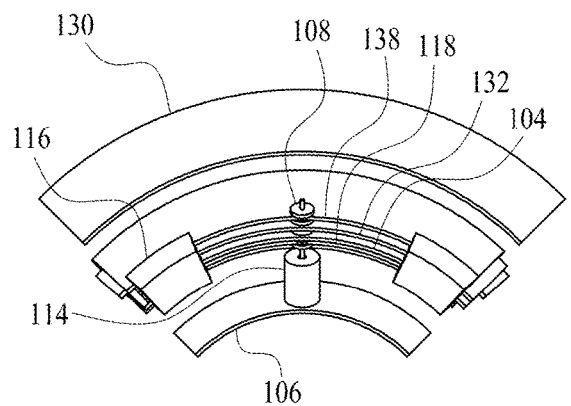
FIG. 14A shows a top view of the fourth embodiment.
Figure 14C:
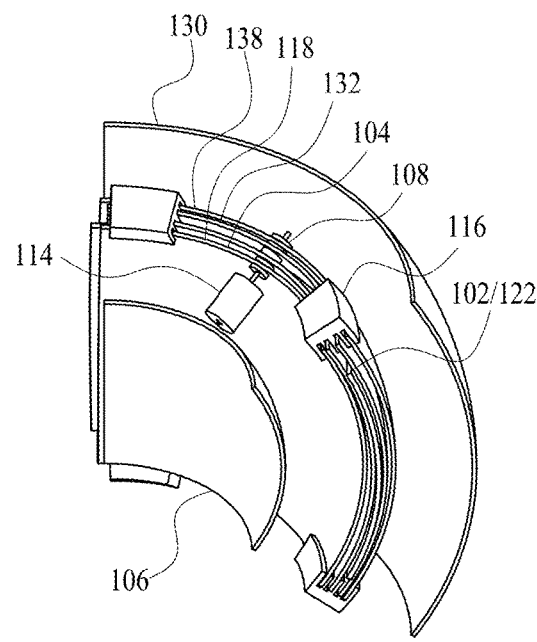
FIG. 14C shows a rear isometric view of the fourth embodiment.
Figure 14B:
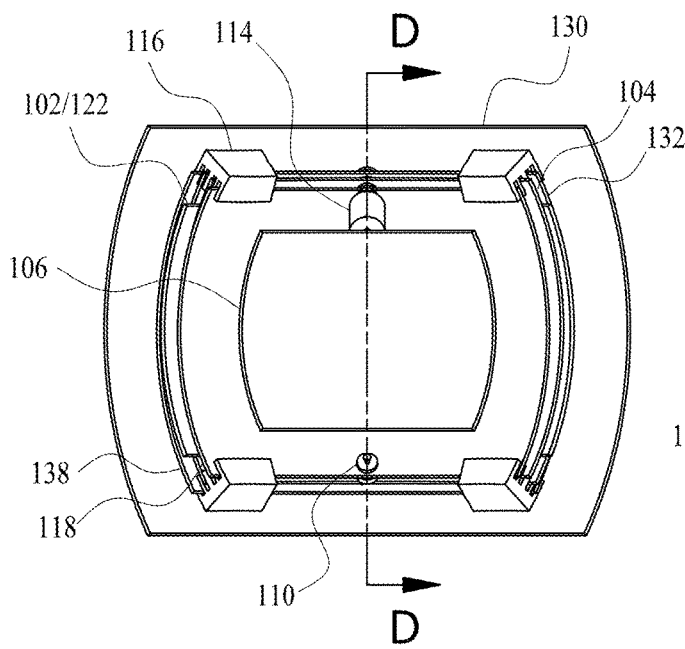
FIG. 14B shows a rear view of the fourth embodiment.
Figure 14D:
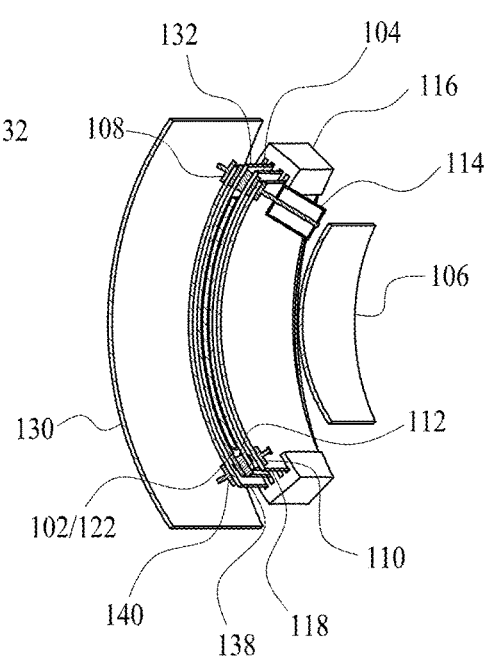
FIG. 14D shows a section D-D respectively of the fourth embodiment.
Figure 15A:
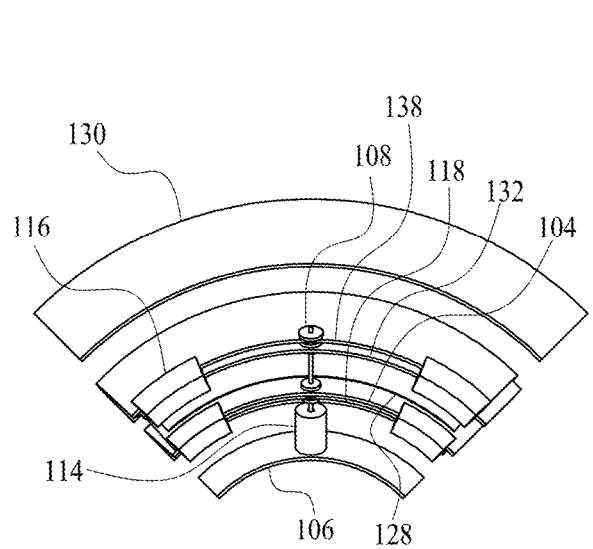
FIG. 15A shows a top view of the fifth embodiment.
Figure 15C:
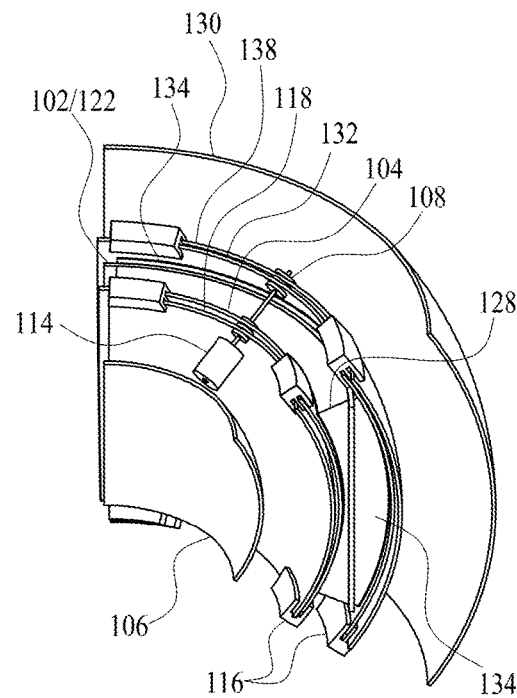
FIG. 15C shows a rear isometric view of the fifth embodiment.
Figure 15B:
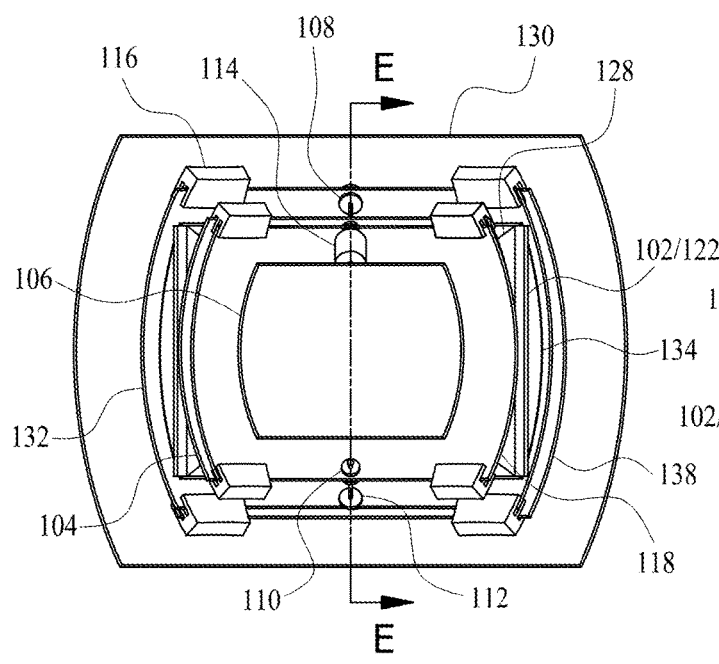
FIG. 15B shows a rear view of the fifth embodiment.
Figure 15D:
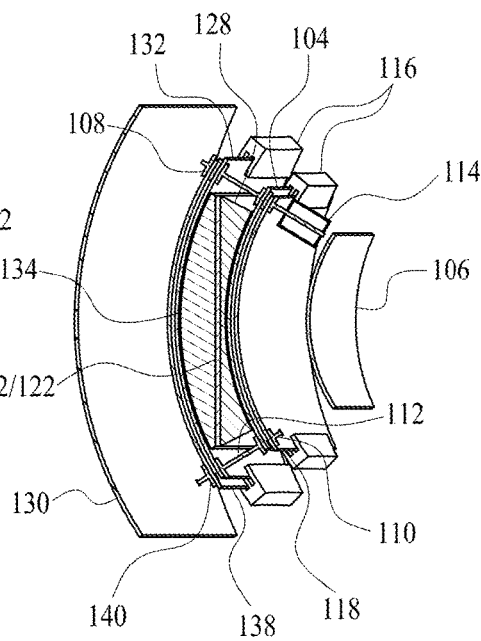
FIG. 15D shows a section E-E of the fifth embodiment.

Concentrically next to the polarizer/see-thru concave mirror plate, near the LCD occluder (122), is the occluding composite reflector (132). The occluding composite reflector plate (132) is composed of spherically curved transparent base plate with equal longitudinal areas of retro-reflector strips (132A), convex mirror strips (132B), and transparent optical slits (132C) symbolically drawn in FIG. 13B. The transparent optical slits (132C) of the occluding composite reflector (132) are aligned radially with transparent optical slits (104D) of the composite reflector (104). The occluding composite reflector (132) and spherically curved composite reflector (104) are mounted near the edges on the middle crank arm of the drive crank (108) while the counterbalances (118 and 138) are mounted on the opposite top and bottom crank arms of the drive crank (108). At the opposite side near edges, the composite reflectors (104 and 132) are both mounted on the same crank (112). Likewise, also at the opposite side near the edges, the counterbalances (118 and 138) are mounted at separate slave cranks (110 and 140). The occluding composite reflector (132) and spherically curved composite reflector sandwiches the LCD occluder (122) and the concave display (102) with space as near as possible, allowing spherical-circular scanning movement.

FIGS. 1, 2A/B/C, 3A/B/C/D, 12, 13A/B, and 14A/B/C/D

Non-polarized light from external view (45) encounters the occluding polarizer (130A). The occluding polarizer (130A) has longitudinal polarizing orientation (130A'). The same polarizing orientation of display polarizer (102B, 102B'). Transmitted light (47) from the polarizer (130A) becomes linearly polarized with longitudinal orientation (130A'). The polarized light (130A) next encounters the see-thru concave mirror (130B). About half of the light are reflected back and dissipates out. The other half pass thru with the same polarized orientation. The light that pass thru encounters the retro-reflector strips (132A) at the occluding composite reflector (132). The linearly polarized retro-reflected light becomes elliptically polarized (49). It is reflected back to the same location at the see-thru concave mirror (130B) where it originated. About half of this light (49) passes thru and dissipates out. The other half of the light (51) is reflected back and maintains its elliptically polarized orientation. The light (51) encounters the convex mirror strips (132B) at the occluding composite reflector (132).

The reflected light (53) maintains its elliptically polarized orientation and encounters the see-thru concave mirror (130B). Half of the light passes thru and dissipates out. The other half of the light (55) is reflected and pass thru (57) the optical slits (132C) and reach the LCD occluder (122). The light (57) encounters the LCD front polarizer (122A) with rotated longitudinal polarizing orientation (122N). The transmitted light (59) becomes linearly polarized again and encounters liquid crystal layers/circuits (122B) which in turn controls how much the polarized orientation of the light (61) is twisted. The polarized light (61) is twisted by 90 degrees when no charge is applied on the circuit so it passes thru (63) the LCD rear polarizer (122C) which has longitudinal polarizing orientation (102a). The amount of light passing thru the LCD rear polarizer (122C) depends on the charge applied to the pixel units which is controlled programmatically by controller circuits (126) and computer. The amount of light that passes thru (63) the LCD rear polarizer (122C) that reaches the concave display (102) can range from 0% to 100% of polarized light (61).

Parallel beams of light (69), representing view to infinity, parallel to radial axis (67), originating from the concentric center (21) that hits the retro-reflector strips (132A) will be folded (71) and focused at the LCD occluder (122) which is also the image surface. The LCD occluder (122) controls the image coming from external view (57) that would reach the spherically curved polarized display (102). All light (47) directly hitting the convex mirror strips (132B) are reflected back and dissipates. All light (47) directly hitting the transparent optical slits (132C) will be blocked by LCD front polarizer (122A). Image from external view (63) merges with image from the display (102). Both images passes thru and rapidly scanned from the transparent optical slits (104D) of the spherically curved composite reflector (104). From here, the operation is the same with first embodiment up to reaching the eye.

FIGS. 1, 2A/B/C/D, 3A/B/C/D, 12, 13B, 15A/B/C/D, 16A/B/C/D

The fifth embodiment is the same as the fourth embodiment except some replacement and modification of parts. The transparent optical slits (132C) are covered with polarizer strips with rotated longitudinal polarizing orientation (122N). The spherically curved concave display (102) is replaced by cylindrically curved or flexible transparent display (142), like for example transparent OLED display or transparent LCD display. The cylindrically curved display (142) is topped at the convex side by the cylindrically curved LCD occluder (144). The cylindrically curved LCD occluder (144) is topped at the convex side by fiber-optic faceplate (134) with convex spherical surface with center at the concentric center (21). The cylindrically curved display (142) is topped at the concave side by fiber-optic faceplate (128) with concave spherical surface with center at concentric center (21).

FIGS. 1, 2A/B/C, 3A/B/C/D, 12, 13A/B, 15A/B/C/D, and 16A/B/C/D

The operation is the same as embodiment 4 from light coming from external view (45) up to being folded (71) then reaching the transparent optical slits (132C). The transparent optical slit (132C) is topped with polarizer strips with rotated longitudinal polarizing orientation (122N). This blocks all polarized light going directly to the slits coming from external view (47) allowing only polarized light that hits the retro-reflector strips (132A) that converts it to elliptically polarized light (49, 51, 53, 55). The convex surface of the fiber-optic faceplate (134) is the image surface where external view beams of light is focused. The image formed at the convex surface of the fiber-optic faceplate (134) is relayed to the cylindrically curved LCD occluder (144). The LCD occluder (144) is programmatically controlled to block the image or parts of the image. Pixel units of the LCD occluder (144) are also controlled to allow how much light passes thru. The image that passes thru merges with the image produced by the cylindrically curved display (142). Both images from the external view (73) and the display (5) are relayed by the fiber-optic faceplate (128) to the concave surface. Both images pass thru and rapidly scanned from the transparent optical slits (104D) of the spherically curved composite reflector (104). From here, the operation is the same with first embodiment up to reaching the eye.

Advantages

From the description above, a number of advantages of some embodiments of my NED become evident:
a. Fewer elements along the path of light from external view to the eye and fewer optical folding have been used to realize clearer view of the NED display.
b. Concave surface of the exit polarizer (106B) provided bigger space between the eye and NED to accommodate eyeglasses and other devices.
c. The shape of the NED concentric optical system can be more freely designed for aesthetic look.
d. The more than 180 FOV can be accommodated.
e. Occluding system which allows the external view and local display to be both controlled and merged into one can be fully realized.

Accordingly, the reader will see that the NED-RapSIS of the various embodiments can be used as NED for various AR and VR applications that requires bigger FOVs than currently available, that is lightweight, and conveniently not bulky. In addition, the NED-RapSIS can be shaped aesthetically negligible or without compromising the balanced movement of parts.

Although the description above contains many specificities, these should not be construed as limiting the scope of the embodiments but as merely providing illustrations of some of several embodiments. For example, longitudinal polarizing orientation of the optical system can be oriented to different angle; other combinations of the embodiments can be used to satisfy user requirements; other spherically and circularly restraining device can be used to guide the spherically moving parts; other mechanical device or means to drive the moving parts spherically and circularly that achieves balancing can be used; other types of motors can be used to drive the cranks; slave cranks can be attached to a motor and be driving cranks as well; the counterbalance can be any number and in any shape like for example a ring shape or made up of any material as long as it counterbalances to reduce the vibrations to negligible or none; other choice of FOV can be used; this can be bi-ocular (single) or binocular (in pair); other display that produces spherically concave image can be used; other angles between crank shaft and crank arms can be used as long as all cranks arms have identical angles from crank shaft; the cylindrically curved display can be elliptically curved or free-form curved display.

I claim:

1. A near-eye display (NED) device comprising:
 a display with a spherically-curved concave image surface, wherein a first polarizer is disposed on the display;
 a spherically and circularly rotating tandem comprising:
 a spherically-curved concave composite reflector, and a spherically-curved transparent counter-balance; a motor-driven driving crank operable to rotate the spherically-curved concave composite reflector and the spherically-curved transparent counter-balance;
 a see-thru spherically-curved mirror-polarizer composite comprising a mirror at the convex side and a second polarizer at the concave side; and
 a support frame.

2. The device of claim 1, further including one or more guides to constrain both the spherically-curved concave composite reflector and the spherically-curved transparent counter-balance to spherical movements.

3. The device of claim 1 wherein the spherically-curved concave image surface is transparent.

4. The device of claim 3, further comprising an occluding optical system.

5. The device of claim 1,
 wherein the display is cylindrically curved,
 wherein a fiberoptic faceplate is disposed on the concave side of the display, and
 wherein the first polarizer is disposed on a concave surface of the fiberoptic faceplate.

6. The device of claim 5,
 wherein the display is transparent and cylindrically curved,
 wherein an LCD occluder is disposed on the convex side of the display, and
 wherein a second fiberoptic faceplate is disposed on a convex side of the LCD occluder,
 further including an occluding optical system.

7. The device of claim 1,
 wherein an LCD occluder is disposed on a convex side of the spherically-curved concave image surface,
 further comprising a separate controller circuit.

8. The device of claim 1,
 wherein the support frame is operable to mount the device to a user's head.

* * * * *